United States Patent
Yildiz et al.

(10) Patent No.: US 8,688,717 B2
(45) Date of Patent: Apr. 1, 2014

(54) METHOD AND APPARATUS FOR GENERATING AND USING AN INTEREST GRAPH

(75) Inventors: Mehmet E. Yildiz, Campbell, CA (US); Kelly L. Dempski, Redwood City, CA (US); Sai Prasanth V Kandallu, San Jose, CA (US)

(73) Assignee: Accenture Global Service Limited, Dublin (IE)

( * ) Notice: Subject to any disclaimer, the term of this patent is extended or adjusted under 35 U.S.C. 154(b) by 108 days.

(21) Appl. No.: 13/398,313

(22) Filed: Feb. 16, 2012

(65) Prior Publication Data

US 2013/0218887 A1 Aug. 22, 2013

(51) Int. Cl.
*G06F 17/30* (2006.01)
*G06F 15/16* (2006.01)
*G06F 15/173* (2006.01)
*G06F 3/00* (2006.01)

(52) U.S. Cl.
CPC ............... *G06F 17/30* (2013.01); *G06F 15/16* (2013.01); *G06F 15/173* (2013.01); *G06F 3/00* (2013.01)
USPC ........... 707/749; 707/736; 707/748; 707/758; 709/203; 709/224; 715/753; 715/758

(58) Field of Classification Search
CPC ....... G06Q 10/00; G06Q 10/10; G06Q 50/01; G06Q 30/00; G06Q 30/02; G06F 17/30; G06F 3/00; G06F 15/16
USPC ............ 705/7.27, 14.23–14.25, 14.51–14.54, 705/14.58, 14.6; 707/600, 602–603, 688, 707/694, 705–710, 748–749, 776–779, 736, 707/758; 709/203, 224; 715/753, 758
See application file for complete search history.

(56) References Cited

U.S. PATENT DOCUMENTS 6,345,264 B1 2/2002 Breese et al.
(Continued)

FOREIGN PATENT DOCUMENTS

| WO | WO 2005/055519 | * | 6/2005 |
| WO | WO 2009/077655 | * | 6/2009 |

OTHER PUBLICATIONS

Golle, "Revising the Uniqueness of Simple Demographics in the US Population," WPES '06, Oct. 30, 2006, 4 pages.

(Continued)

*Primary Examiner* — Srirama Channavajjala
(74) *Attorney, Agent, or Firm* — Harrity & Harrity, LLP

(57) ABSTRACT

Methods and apparatuses are provided for generating, updating, and using an interest graph. A plurality of interests representing a plurality of subjects' affinities towards a plurality of topics may be obtained. A processing device may generate an interest graph based on the obtained interests. The generated interest graph may include: (i) at least two nodes, each of the at least two nodes representing an interest of the obtained interests, wherein the obtained interests are free of any personally identifiable information associated with the plurality of subjects and (ii) at least one link connecting a first node to a second node of the at least two nodes, the at least one link representing a relatedness of the interest represented by the first node to the interest represented by the second node.

38 Claims, 8 Drawing Sheets

(56) References Cited

U.S. PATENT DOCUMENTS

| | | | |
|---|---|---|---|
| 6,484,146 B2* | 11/2002 | Day et al. | 705/14.14 |
| 6,718,329 B1* | 4/2004 | Selvin et al. | 707/741 |
| 7,549,309 B2* | 6/2009 | Beringer et al. | 70/102 |
| 2004/0078432 A1* | 4/2004 | Manber et al. | 709/205 |
| 2007/0179846 A1* | 8/2007 | Jain et al. | 705/14 |
| 2008/0027979 A1* | 1/2008 | Chandrasekar et al. | 707/103 R |
| 2008/0065440 A1* | 3/2008 | Graham et al. | 705/7 |
| 2009/0048860 A1* | 2/2009 | Brotman et al. | 705/1 |
| 2009/0055476 A1* | 2/2009 | Markus et al. | 709/204 |
| 2009/0222551 A1* | 9/2009 | Neely et al. | 709/224 |
| 2009/0307054 A1* | 12/2009 | D'Imporzano et al. | 705/10 |
| 2010/0223341 A1* | 9/2010 | Manolescu et al. | 709/206 |
| 2011/0040767 A1* | 2/2011 | Kunjithapatham et al. | 707/749 |
| 2011/0307312 A1* | 12/2011 | Goeldi | 705/14.6 |
| 2012/0271860 A1* | 10/2012 | Graham et al. | 707/798 |
| 2013/0138479 A1* | 5/2013 | Mohan et al. | 705/7.33 |

OTHER PUBLICATIONS

Emam et al., "The re-identification risk of Canadians from Longitudinal demographics," BMC Medical Informatics & Decision Making, 2011, 12 pages, http://www.biomedcentral.com/1472-6947/11/46.

"The Interest Graph and What Marketers Should Know About It", Stefan Herbert, published Dec. 9, 2011, retrieved from "http://www.business2community.com/marketing/the-interest-graph-and-what-marketers-should-know-about-it-0105459" on Jan. 26, 2012.

* cited by examiner

METHOD AND APPARATUS FOR GENERATING AND USING AN INTEREST GRAPH

FIELD

The instant disclosure relates generally to techniques for providing targeted content to consumers and, more specifically, to techniques for identifying and providing targeted content to consumers using an interest graph.

BACKGROUND

Businesses constantly strive to gain information about consumers in order to customize the manner in which they engage with those consumers. For example, businesses regularly develop customized advertisements (i.e., "targeted ads") seeking to appeal to a specific class of consumers based upon analyzed consumer data. Historically, businesses have relied upon information such as demographic data, geographic data, behavioral data, contextual data, and timing data in order to customize engagement with consumers. However, over-reliance on these conventional types of consumer data may limit the effectiveness of the engagement.

For example, according to a recent survey conducted by Econsultancy, more than two-thirds (68%) of companies are targeting customers based on demographic data, while sixty-four percent (64%) of companies are utilizing geographic data about consumers to generate targeted advertising. Thus, demographic data and geographic data continue to be the preferred types of data for businesses to use in developing targeted advertisements and the like. This is largely due to the fact that demographic data and geographic data have conventionally been the easiest types of consumer data to obtain. For example, businesses routinely gather these types of information through customer loyalty programs and customer satisfaction surveys. However, there are inherent drawbacks associated with over-reliance on these types of consumer information for purposes of targeting consumers with customized content.

For example, consumers are becoming increasingly protective of demographic and geographic data due to privacy concerns. Indeed, many governments have taken legislative action to address these privacy concerns. As such, demographic and geographic data are not as easily obtained in the present day as they once were. Furthermore, these privacy concerns may be well-founded. For example, studies indicate that analysis of basic demographic information (e.g., gender, ZIP code, and date of birth) allows for unique identification of sixty-three percent (63%) of the U.S. population. Moreover, research indicates that demographic and geographic data do not directly determine the consumption choices of consumers. For example, being in a certain age group or residing in a certain ZIP code are not necessarily the reasons why a consumer purchases a given product or service.

In recent years, increased attention has been paid to the value of consumer interest information. As used herein, an "interest" may include any topic that a given person/entity feels favorably or unfavorably towards. For example, an interest could include products (e.g., books), types of products (e.g., non-fiction books), people (e.g., political figures), activities (e.g., skiing), businesses/brands (e.g., Apple®), etc. Consumer interest information has received increased attention due, in part, to the fact that there is a direct and causal relationship between consumers' interests and consumers' consumption behavior. That is to say, unlike demographic and geographic data about consumers, interest information about consumers can actually be used to predict consumption behavior (e.g., what products/services a consumer is likely to buy).

However, conventional methods and systems are unable to harness the utility of consumer interest information. Accordingly, it is desirable to provide techniques for generating and using an interest graph that overcome many of the drawbacks associated with conventional techniques for targeted engagement with consumers.

SUMMARY

The instant disclosure describes method and apparatuses for generating, updating, and using an interest graph. To this end, in one example, a method for generating an interest graph is provided. The method includes obtaining a plurality of interests representing a plurality of subjects' affinities towards a plurality of topics to provide obtained interests. Based on the obtained interests, a processing device may be used to generate an interest graph. The generated interest graph includes at least two nodes. Each of the nodes represent an interest of the obtained interests. The obtained interests are free of any personally identifiable information associated with the plurality of subjects. That is to say, in this example, the nodes do not represent any additional information (e.g., names of subjects, demographic information of subjects, etc.) beyond interests. However, in other embodiments of the present disclosure, nodes may represent additional information beyond interests (e.g., names of subjects, demographic information of subjects, etc.). Nonetheless, the generated interest graph also includes at least one link connecting a first node to a second node of the at least two nodes. The at least one link represents the relatedness of the interest represented by the first node to the interest represented by the second node.

In one embodiment, obtaining the plurality of interests includes obtaining self-stated interests. Self-stated interests are categorical (i.e., empirical) indications of the plurality of subjects' interests. In one example, the method includes analyzing a website that at least one of the plurality of subjects has interacted with in order to obtain the self stated interests. Consistent with the instant method, there are a variety of ways that a website can be analyzed to obtain the self-stated interests. For example, a website can be analyzed to ascertain: (i) whether at least one of the plurality of subjects has indicated on the website that they "like" a particular topic (e.g., by clicking a "like" button linked to their Facebook® account); (ii) whether at least one of the plurality of subjects has posted a message on the website indicating that they are interested in the particular topic (e.g., by posting a message stating, "I am interested in Apple® products."); (iii) whether at least one of the plurality of subjects has posted a rating on the website indicating that they are interested in the particular topic (e.g., by posting a five-star rating on a restaurant-review website, such as Yelp.com); and/or (iv) whether the at least one of the plurality of subjects has posted a review on the website indicating that they are interested in the particular topic (e.g., a movie-review indicating an interest in the movie).

In another example, obtaining the plurality of interests includes obtaining self-revealing interests. Self-revealing interests are permission-based indications of the plurality of subjects' interests. For example, a self-revealing interest could include an interest that is revealed through a subject's purchase history on a website as tracked by a loyalty program. Because the subject must have authorized the proprietor of the website to track this information, any interest that is revealed in this manner is said to be "permission-based." In one embodiment, a website that at least one of the plurality of subjects has interacted with is analyzed in order to obtain the self-revealing interests. As with the self-stated interests discussed above, there are a variety of ways that a website can be analyzed to obtain the self-revealing interests. For example, a website can be analyzed to ascertain: (i) at least one of the plurality of subject's purchase history via the website; (ii) at least one of the plurality of subject's web-browsing behavior on the website; and/or (iii) words contained within messages posted by at least one of the plurality of subjects on the website.

In one example, each of the one or more links included as part of the interest graph include a weight. The weight included within a link indicates the relatedness of the interests represented by each of the nodes that the link is connected to.

In another example, the method includes the additional step of obtaining demographic information (e.g., gender, age, educational level, ZIP code, etc.) describing at least one of the plurality of subjects. In this example, the interest graph may be generated based on both the obtained demographic data and the obtained interests. In still another example, any of the one or more links may include at least a portion of the demographic data, typically in aggregated or otherwise non-identifying form. For example, a link might include demographic data indicating the average age of a subject who is interested in each of the nodes that the link is connected to.

In one example, the method includes the additional step of obtaining at least one new interest representing at least some of the plurality of subjects', or at least one new subject's, affinity towards at least one topic to provide at least one new interest. The generated interest graph may be updated by a processing device based on the at least one new interest to provide an updated interest graph. In one example, the processing device may be used to generate display data representative of at least a portion of either the generated interest graph and/or the updated interest graph to provide a visual representation of the generated/updated interest graph.

In still another example, the method includes the additional step of obtaining at least one interest representing at least one new subject's affinity towards at least one topic to provide a new subject's obtained interests. The new subject's obtained interests may be identified in the interest graph. At least one interest that is related to, but different from, the new subject's obtained interests may be identified via the generated interest graph to provide at least one related interest. In one example, the at least one related interest may be presented to the at least one new subject. In another example, presenting the at least one related interest to the at least one new subject includes selecting which at least one related interest to present based on predetermined threshold information.

In one embodiment of the instant disclosure, a method for using an interest graph representing the relatedness of a plurality of subjects' affinities towards a plurality of topics is also provided. In this example, the method includes the step of obtaining, by a processing device, the interest graph. The interest graph includes at least two nodes, each of the at least two nodes representing one of a plurality of mapped interests. In one example, each of the at least two nodes may represent only one of a plurality of mapped interests. That is to say, in one example, each of the nodes may represent an interest, but not any additional information (e.g., personally identifiable information associated with the plurality of subjects). In any event, the interest graph also includes at least one link connecting a first node to a second node of the at least two nodes. The at least one link represents the relatedness of a first mapped interest represented by the first node to a second mapped interest represented by the second node. Continuing with this embodiment, the method includes obtaining, by the processing device, at least one interest from at least one new subject representing the at least one new subject's affinity towards at least one topic to provide an obtained at least one interest. The method further includes matching, by the processing device, the obtained at least one interest with at least one of the plurality of mapped interests to provide at least one matching interest. Finally, the method includes identifying, by the processing device, at least one candidate interest for the at least one new subject based on the at least one matching interest.

In one example of this method, each at least one link includes a weight indicating the relatedness of the interests represented by each of the nodes that the link is connected to. In another example, the method includes the additional step of presenting information related to the at least one candidate interest to the at least one new subject. As used herein, the "information related to the at least one candidate interest" may include the candidate interest itself (i.e., a perceptible manifestation of the candidate interest, such as a visual representation of the candidate interest) or tangential information corresponding to the candidate interest (e.g., a video showing an advertisement for the candidate interest, where the candidate interest is a product or service available for purchase). In still another example, presenting information related to the at least one candidate interest to the at least one new subject includes selecting which of the at least one candidate interest to present information related thereto based on predetermined threshold information. Finally, in one example, presenting information related to the at least one candidate interest to the at least one new subject includes generating, by the processing device, display data representative of the information related to the at least one candidate interest to provide a visual representation of the information related to the at least one candidate interest.

Related apparatuses and computer readable media for carrying out the foregoing methods are also disclosed.

BRIEF DESCRIPTION OF THE DRAWINGS

The features described in this disclosure are set forth with particularity in the appended claims. These features will become apparent from consideration of the following detailed description, taken in conjunction with the accompanying drawings. One or more embodiments are now described, by way of example only, with reference to the accompanying drawings wherein like reference numerals represent like elements and in which:

DETAILED DESCRIPTION

Figure 1:
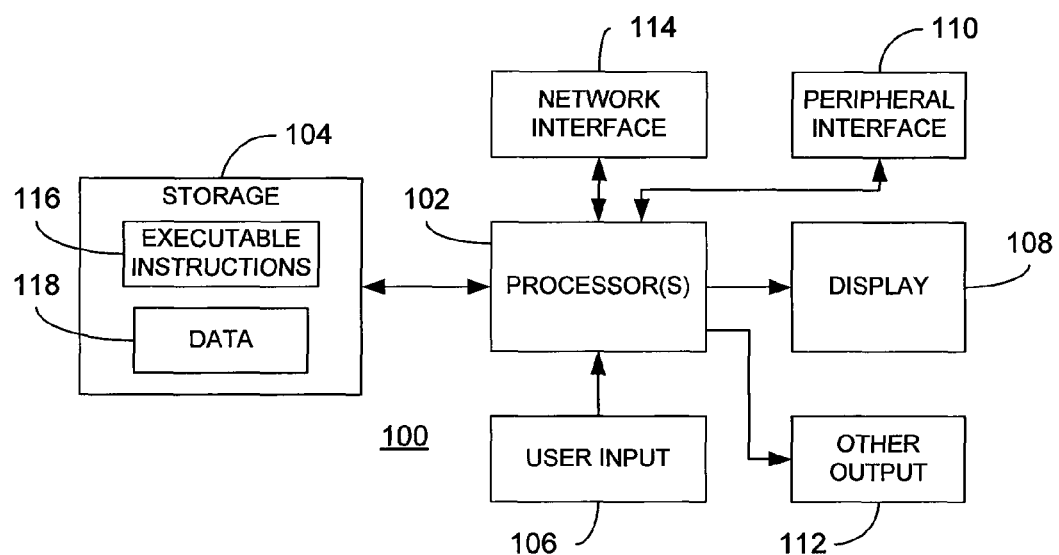
FIG. 1 is a block diagram illustrating one example of a computing device for generating, updating, and using an interest graph in accordance with the instant disclosure.

Referring now to FIG. 1, one example of a computing device 100 for generating, updating, and using an interest graph is illustrated. The device 100 includes a processor 102 coupled to a storage component 104. The storage component 104, in turn, includes stored executable instructions 116 and data 118. In an embodiment, the processor 102 may comprise one or more of a microprocessor, microcontroller, digital signal processor, co-processor or the like or combinations thereof capable of executing the stored instructions 116 and operating upon the stored data 118. Likewise, the storage component 104 may comprise one or more devices such as volatile or nonvolatile memory including, but not limited to, random access memory (RAM) or read only memory (ROM). Further still, the storage component 104 may be embodied in a variety of forms, such as a hard drive, optical disc drive, floppy disc drive, etc. Processor and storage arrangements of the types illustrated in FIG. 1 are well known to those having ordinary skill in the art. In one embodiment, the processing techniques described herein are implemented as a combination of executable instructions and data within the storage component 104.

As shown, the device 100 may include one or more user input devices 106, a display 108, a peripheral interface 110, other output devices 112 and a network interface 114 in communication with the processor 102. The user input device 106 may comprise any mechanism for providing user input to the processor 102. For example, the user input device 106 may comprise a keyboard, a mouse, a touch screen, microphone and suitable voice recognition application, or any other means whereby a user of the device 100 may provide input data to the processor 102. The display 108, may comprise any conventional display mechanism such as a cathode ray tube (CRT), flat panel display, or any other display mechanism known to those having ordinary skill in the art. In an embodiment, the display 108, in conjunction with suitable stored instructions 116, may be used to implement a graphical user interface. Implementation of a graphical user interface in this manner is well known to those having ordinary skill in the art.

The peripheral interface 110 may include the hardware, firmware and/or software necessary for communication with various peripheral devices, such as media drives (e.g., magnetic disk or optical disk drives), other processing devices or any other input source used in connection with the instant techniques. Likewise, the other output device(s) 112 may optionally comprise similar media drive mechanisms, other processing devices or other output destinations capable of providing information to a user of the device 100, such as speakers, LEDs, tactile outputs, etc. Finally, the network interface 114 may comprise hardware, firmware and/or software that allows the processor 102 to communicate with other devices via wired or wireless networks, whether local or wide area, private or public, as known in the art. For example, such networks may include the World Wide Web or Internet, or private enterprise networks, as known in the art.

While the device 100 has been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the device 100 may include a greater or lesser number of components than those illustrated. Once again, those of ordinary skill in the art will appreciate the wide number of variations that may be used is this manner. Further still, although a single computing device 100 is illustrated in FIG. 1, it is understood that a combination of such computing devices may be configured to operate in conjunction (for example, using known networking techniques) to implement the teachings of the instant disclosure.

Figure 2:
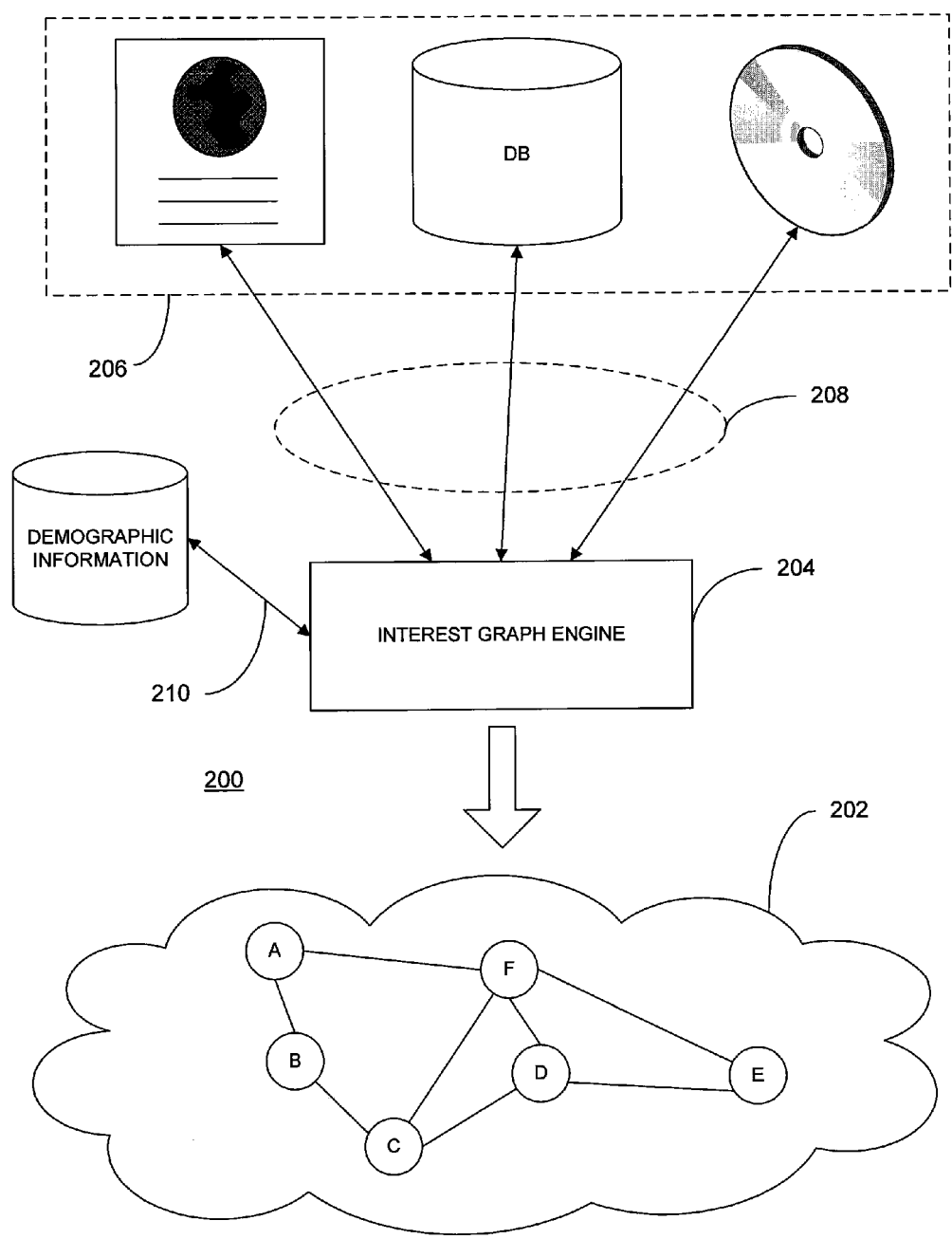
FIG. 2 is a block diagram illustrating one example of a system for generating, updating, and using an interest graph in accordance with the instant disclosure.

FIG. 2 is a block diagram illustrating one example of a system 200 for generating, updating, and using an interest graph 202 in accordance with the instant disclosure. The system 200 includes an interest graph engine 204 in communication with one or more interest sources 206. In practice, the functionality of the interest graph engine 204 may be implemented, for example, using the computing device 100 of FIG. 1. However, those having ordinary skill in the art will appreciate that the interest graph engine 204 may be implemented using any suitable combination of hardware and/or software as known in the art.

The interest graph engine 204 may communicate with the one or more interest sources 206 over any suitable wired or wireless communications network known in the art. In one example, the interest graph engine 204 communicates with the one or more interest sources 206 over the Internet. In line with the teachings of the present disclosure, the interest sources 206 may include any suitable sources from which interests 208 (i.e., interest information) can be obtained. For example, an interest source 206 may include a website, such as a person or entity's Facebook® page. In another example, an interest source 206 may include a website such as an online shopping website (e.g., Amazon.com™). In still another example, an interest source 206 may include a website such as a person or entity's Twitter™ page that includes that person or entity's Twitter™ stream. Further still, in one example, an interest source 206 may include a website such as a Linkedin™ Skills page. In other embodiments, the one or more interest sources 206 may include one or more databases or computer readable media storing interests 208.

As discussed above, an "interest" may include any topic that a given person/entity (i.e., a "subject") feels favorably or unfavorably towards. For example, an interest could include products (e.g., books), types of products (e.g., non-fiction books), people (e.g., political figures), activities (e.g., skiing), businesses/brands (e.g., Apple®), etc. In any event, the interest graph engine 204 is operative to obtain a plurality of interests 208 from the interest sources 206. The plurality of interests 208 represent a plurality of subjects' affinities towards a plurality of topics (e.g., digital manifestations of a plurality of peoples' affinities towards a plurality of topics). The plurality of interests 208 may be obtained by the interest graph engine 204 in a variety of ways. In one example, the interest graph engine 204 is operative to fetch the interests 208 from the interest sources 206. This may be accomplished, for example, using suitable web-crawling and/or data-mining techniques known in the art, where the interest source 206 is a website. Similarly, in one embodiment, the interest graph engine 204 is operative to fetch the interests 208 from one or more databases and/or computer readable media. Alternatively, the interests 208 may be pushed to the interest graph engine 204 in order for the interest graph engine 204 to obtain the plurality of interests 208.

The plurality of interests 208 may include self-stated interests and/or self-revealing interests. Self-stated interests include categorical indications of the plurality of subjects'interests. Self-stated interests may be obtained, for example, by analyzing a website that at least one of the plurality of subjects has interacted with. For example, in order to obtain self-stated interests, the interest graph engine 204 may analyze: (i) whether any of the plurality of subjects has indicated on a website that they "like" a particular topic (e.g., by clicking a "like" button linked to their Facebook® account); (ii) whether any of the plurality of subjects has posted a message on a website indicating that they are interested in a particular topic (i.e., the mere posting of the message may indicate an interest in a particular topic without necessitating semantic analysis of the words in the message); (iii) whether any of the plurality of subjects has posted a rating on a website indicating that they are interested in a particular topic (e.g., by posting a five-star rating on a restaurant-review website, such as Yelp.com™); and/or (iv) whether any of the plurality of subjects has posted a review on a website indicating that they are interested in the particular topic (e.g., by posting a movie-review on Rottentomatos.com™ indicating an interest in a movie).

Self-revealing interests include permission-based indications of the plurality of subjects' interests. Self-revealing interests may be obtained, for example, by analyzing a website that at least one of the plurality of subjects has interacted with. For example, in order to obtain self-revealing interests, the interest graph engine 204 may analyze: (i) at least one of the plurality of subject's purchase history via a website; (ii) at least one of the plurality of subject's web-browsing behavior on a website; and/or (iii) words contained within messages posted by at least one of the plurality of subjects on a website. Consistent with the foregoing, a self-revealing interest could include an interest that is revealed through a subject's purchase history on a website as tracked by a loyalty program. Because the subject must have authorized the proprietor of the website to track this information, any interest that is revealed in this manner is said to be "permission-based." Furthermore, suitable techniques known in the art may be employed for purposes of analyzing the one or more websites in order to obtain the self-revealing interests. For example, suitable web-crawling and data-mining techniques may be employed to analyze a subject's purchase history and/or web-browsing behavior. Suitable semantic analysis techniques known in the art may be employed in order to determine whether words contained within messages posted by a subject to a website indicate that subject's interest in a particular topic. For example, a message stating "I think Apple products have high quality," may be parsed by a suitable semantic analysis tool existing as part of, or external to, the interest graph engine 204 in order to determine that the author of the message is interested in the Apple® brand.

Upon obtaining the interests 208, the interest graph engine 204 is operative to generate an interest graph 202 based on the obtained interests 208. The generated interest graph 202 includes at least two nodes. In FIG. 2, the exemplary interest graph is depicted as having six (6) nodes, labeled A-F. Each of the nodes represents an interest of the obtained interests 208. In this embodiment, the obtained interests 208 are free from any personally identifiable information associated with any of the subjects whose interests are used to generate the interest graph 202. As used herein, personally identifiable information includes information that can be used to uniquely identify a single individual (e.g., the name of a person, a person's social security number, etc.). That is to say, in this example, the nodes do not represent personally identifiable information about the subjects, such as their names, social security numbers, etc. However, it is contemplated that in some embodiments, the obtained interests 208 may include personally identifiable information associated with the subjects, and consequently, the nodes may represent more than merely obtained interests 208 (e.g., the identities of the subjects).

The generated interest graph 202 also includes one or more links, as shown. Each link connects a first node (e.g., node A) to a second node (e.g., node B). Each link represents the relatedness of the nodes that it is connected to. As used herein, relatedness (or similar expressions) means the degree to which such interests are associated with each other. For example, although not required, relatedness may be expressed as a likelihood or probability that one interest will be associated with another. Alternatively, relatedness may be expressed in more direct terms, such as the number of times that a given interest has been associated with another. For the purposes of simplicity, the interest graph 202 shown in FIG. 2 only depicts single links between each of the nodes (e.g., there is only a single link between nodes A and B). However, in practice, and as discussed in greater detail with respect to FIG. 3 below, there may be more than one link between two nodes.

Furthermore, while the interest graph 202 depicted in FIG. 2 shows nodes being physically connected via the links, those having ordinary skill in the art will appreciate that in practice, the interest graph 202 may be stored in storage (e.g., storage 104 of FIG. 1) as data (e.g., data 118) in tabular form or the like. For example, in an embodiment where the interest graph 202 is stored in storage as data in tabular form, the rows of the table may represent interest pairs (i.e., two separate interests that are related to one another). Continuing with this example, the one or more columns of the table may represent attribute(s) of the interest pair. Thus, in line with this example, one column may include a weight value associated with a given interest pair that indicates, for example, how strongly related each of the respective interests forming the interest pair are to one another. Of course, additional columns containing attribute data concerning interest pairs may also be included. For instance, another column may include data indicating an average age of subjects who are interested in each of the interests forming the interest pair. Other suitable attribute information for given sets of interest pairs may also be suitably included in accordance with the teachings of the present disclosure.

The interest graph engine 204 is operative to generate display data representative of at least a portion of the generated interest graph 202 to provide a visual representation of the generated interest graph 202. In one example, existing graph visualization programs may be employed in order to create the visual representation (e.g., nodes representing interests connected by links indicating relatedness of nodes) of the generated interest graph 202 (e.g., where the generated interest graph 202 is stored in tabular form or the like). By way of example and not limitation, the R package of igraph or the Flex graph libraries may be employed in order to provide a visual representation of a generated interest graph 202. However, those having ordinary skill in the art will appreciate that several additional or alternative graph visualization programs may be equally employed for this purpose. The display data may be shown on a suitable display, such as display 108.

In one embodiment, the interest graph engine 204 is operative to obtain demographic information 210 describing at least one subject, in addition to the interests 208. As used herein, demographic information includes statistical characteristics of a subject (e.g., a person/entity) or a group of subjects. For example, demographic information may include, but is not limited to, the following information regarding one or more subjects: gender information, residence information, citizenship information, location information (e.g., address information), age information (e.g., date of birth), educational information (e.g., amount of secondary-schooling), etc. In one example, the interest graph engine 204 is operative to generate the interest graph 202 based on both the interests 208 and the demographic information 210. The discussion accompanying FIG. 3 below includes additional details regarding how demographic information 210 may be utilized in generating the interest graph 202.

Figure 3:
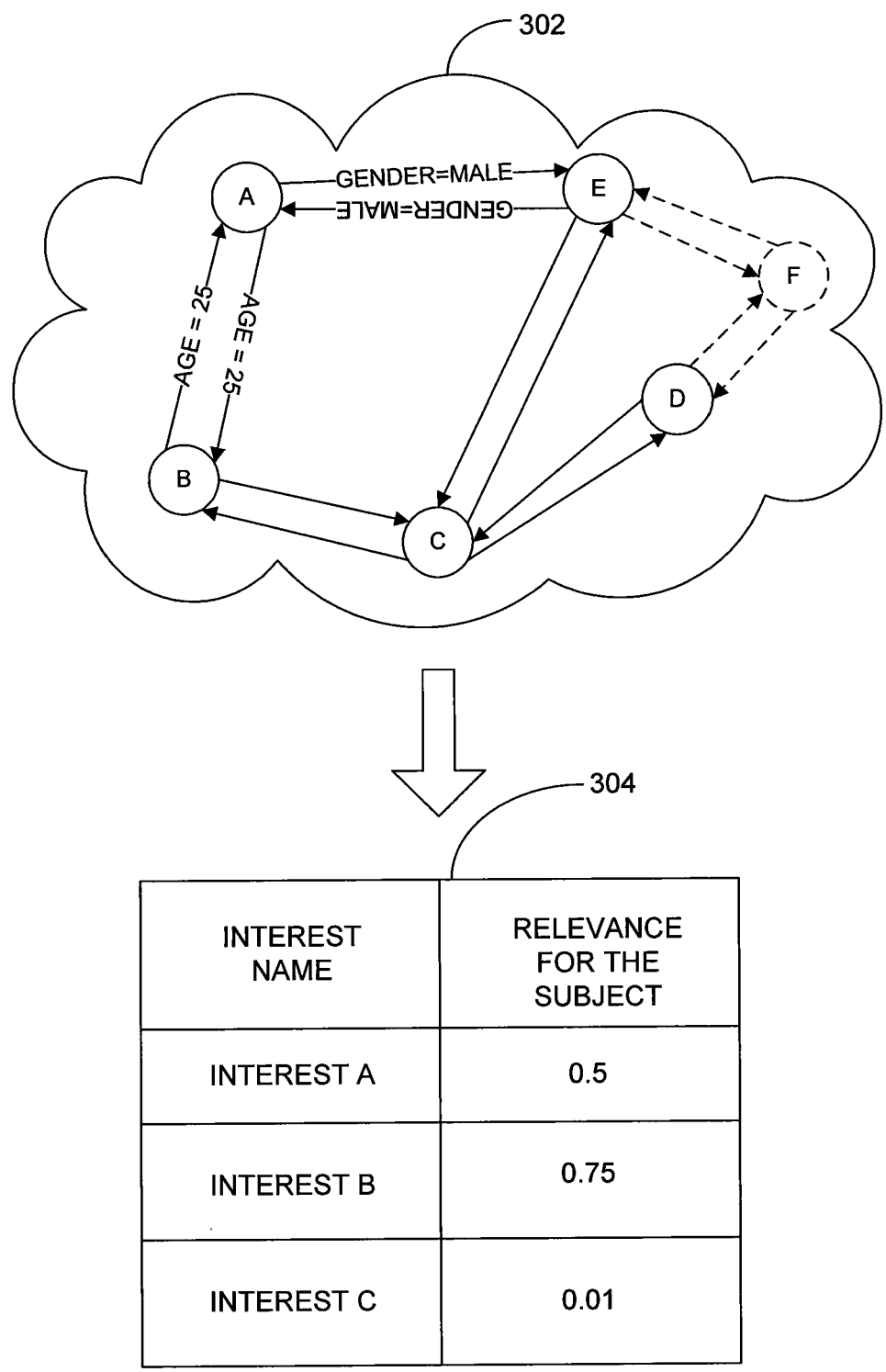
FIG. 3 is a block diagram illustrating one example of an interest graph and a relevancy table derived from the interest graph in accordance with the instant disclosure.

Referring now to FIG. 3, a block diagram illustrating one example of an interest graph 302 and a relevancy table 304 derived from the interest graph 302 is provided. The interest graph 302 shown in FIG. 3 differs from the simplified interest graph 202 shown in FIG. 2 in that interest graph 302 illustrates two links between each of the nodes, each of the two links having a particular direction. For example, interest graph 302 includes one link going from node B to node A (as indicated by the directional arrow) and another link going from node A to node B (as indicated by the other directional arrow). In this example, the link going from node B to node A may indicate the likelihood that a subject interested in the topic represented by node B would also be interested in the topic represented by node A. Conversely, the link going from node A to node B may indicate the likelihood that a subject interested in the topic represented by node A would also be interested in the topic represented by node B.

Each of the links may also include additional information. For example, in one embodiment, each link includes a weight (i.e., a weighting value) indicating the relatedness of the interests represented by each of the nodes that the link is connected to. In an example where the interest graph 302 is replicated as display data perceptible by the human eye, the weight of a given link may be reflected in the thickness and/or length of the link. For example, in one embodiment, the shorter the length of a link between two nodes, the more closely related the interests represented by those two nodes. In another example, the weight of one or more links may be stored as numerical data associated with the links. In practice, the weights may be based on the number of subjects associated with particular interests. For example, assume X number of subjects are associated with interest A, Y number of subjects are associated with interest B, and Z number of subjects are associated with A and B. If Z is non-zero, then links in opposite directions should exist between nodes A and B. In this example, the weight associated with the link from node A to node B could be calculated as Z/X, whereas the weight associated with the link from node B to node A could be calculated as Z/Y. Of course, other techniques for determining such weights could be equally employed.

In addition to weight information, each of the one or more links connecting the nodes in the interest graph 302 may also include at least a portion of demographic information. As discussed with regard to FIG. 2 above, in some embodiments of the present disclosure, the interest graph 302 is generated based on both interests (e.g., interests 208) and demographic information (e.g., demographic information 210). In such a situation, the links may include at least a portion of the obtained demographic information. For example, as shown in interest graph 302, each of the links between node A and node B state "AGE=25." This may indicate, for example, that the average age of subjects' who are interested in the topics represented by nodes A and B is twenty-five years old. Similarly, the information included within the links between nodes A and E may indicate that all of the subjects that are interested in the topics represented by nodes A and E (or at least a certain percentage thereof above a simple majority) are male. Of course, the demographic information contained with the links may be specific to a particular subject (e.g., indicating the gender of the lone subject that is interested in the topics represented by both nodes A and E), aggregated over all of the subjects (e.g., indicating the average age of all of the subjects who were interested in the topics represented by both nodes A and B), or some combination of thereof. Regardless, in an embodiment, the demographic information thus employed is represented in a manner in which it is not possible to identify any particular subject by, for example, aggregation and/or removal of any identifying indicia.

Node F shown in interest graph 302 of FIG. 3 illustrates an exemplary situation where, after an initial interest graph has been generated, a new interest is obtained and the interest graph is updated accordingly. In such a circumstance, the interest graph engine 204 of FIG. 2 is operative to obtain at least one new interest representing (i) at least some of the plurality of subjects' affinities' towards at least one topic or (ii) at least one new subject's affinity towards at least one topic. Stated another way, the new interest could be a new interest of one of the subjects whose interests were considered in generating the initial interest graph 302, or a new interest of a new subject, whose interest(s) were not considered in generating the initial interest graph 302. Regardless, the interest graph 302 depicts a scenario in which a new interest (represented by node F) is mapped to the initialized interest graph 302. Based on a consideration of the relatedness of the interest represented by node F, it is determined that the interest represented by node F is related to the interests represented by nodes E and D, respectively. Accordingly, links are generated between node F and node E, and between node F and node D, respectively. In this manner, a generated interest graph can be updated based on at least one new interest to provide an updated interest graph. In one example, the interest graph engine 204 is operative to generate display data representative of at least a portion of the updated interest graph to provide a visual representation of the updated interest graph.

In one embodiment, interests graphs, such as interest graph 302 shown in FIG. 3, may be used to identify (e.g., predict) topics that a subject is likely to be interested in. The interest graph engine 204 is operative to carry out this functionality as follows. After an initial interest graph has been generated, the interest graph engine 204 is operative to obtain one or more interests representing at least one new subject's affinity towards at least one topic (or a previously analyzed subject's newly discovered affinity toward the at least one topic) to provide a new subject's obtained interests. For example, a person named John Doe may not have had his interest(s) taken into account when the initial interest graph was generated. However, the interest graph engine 204 may obtain data describing one or more of John Doe's interests (using any of the techniques for obtaining interests described above) subsequent to the generation of the initial interest graph. In such a scenario, the interest graph engine 204 is operative to identify the new subject's obtained interest(s) (e.g., John Doe's interest(s)) in the interest graph that was generated initially. That is to say, John Doe might be interested in a topic that was already represented by a node in the interest graph that was generated initially. For example, the initially generated interest graph could include a node representing the activity "skiing." After obtaining John Doe's interests, it might turn out that John Doe is also interested in skiing. Accordingly, the interest graph engine 204 is operative to identify the interest "skiing" on the initially generated interest graph. Thereafter, the interest graph engine 204 may identify, via the generated interest graph, at least one interest that is related to, but different from, the new subject's obtained interest(s) to provide at least one related interest. Continuing with the John Doe example, the interest graph engine 204 might identify, via the initially generated interest graph, that the interest "skiing" is related to the interest "Aspen, Colo." (i.e., the node representing the interest "skiing" is connected via one or more links to the node representing the interest "Aspen, Colo.").

After one or more related interests have been identified using the initially generated interest graph, the interest graph engine 204 may present at least one of the identified related interests (e.g., "Aspen, Colo.") to the at least one new subject. For example, the interest graph engine 204 may generate display data representative of the one or more related interests for display on a display device. Continuing with the John Doe example, this could include presenting the text "Aspen, Colo." on a display screen that John Doe is viewing. Of course, other suitable presentation methods (e.g., generation of a printed report, notification via wired/wireless communication such as via email or text message, etc.) may be equally employed.

One example of means for presenting related interests is shown with regard to the relevancy table 304 of FIG. 3. The relevancy table 304 of FIG. 3 includes a left-hand column entitled "Interest Name" and a right-hand column entitled "Relevance for the Subject." In one example, the relevancy table 304 can be used to list interests (i.e., suggested interests) that are related to, but different from, the interests obtained from the subject under analysis. Thus, if interest information concerning John Doe had been obtained indicating that John Doe is interested in skiing, an exemplary relevancy table could be generated (e.g., by the interest graph engine 204) listing related interests such as (purely by way of example) "Aspen, Colo." as interest A, "Rossignol®" as interest B, and "snowboarding" as interest C.

Additionally, the relevancy table 304 may include values (e.g., numerical values) indicating the degree of relevance for each of the interests to the subject under analysis. For example, in the relevancy table shown 304 shown in FIG. 3, interest A is shown having a relevancy score of 0.5. This indicates how likely the subject under analysis (e.g., John Doe) is to be interested in interest A. Similar relevancy ratings are associated with interests B and C in the table 304. The particular scale used to reflect relevancy ratings is not critical for purposes of the instant disclosure. That is to say, relevancy ratings can be reflected as numerical values (e.g., values between 0 and 1, where a relevancy rating of 1 indicates that an interest is highly relevant to a subject under analysis and a relevancy rating of 0 indicates that an interest is irrelevant to a subject under analysis), using a color scheme, using symbols, etc.

Furthermore, the interest graph engine 204 is capable of filtering which particular related interests are presented to the subject under analysis, for example, via the relevancy table 304. In one embodiment of the present disclosure, presenting at least one related interest to at least one new subject includes selecting which related interest(s) to present based on predetermined threshold information. By way of example, in one embodiment, it may be desirable to present the three interests having the highest relevancy ratings to the subject for review. Accordingly, the interest graph engine 204 is operative to apply a predetermined threshold value to all of the candidate related interests (i.e., all of the interests identified as being related to the interest(s) obtained from the new subject), such that only the three (3) related interests having the highest relevancy values are presented. To illustrate this point, assume that relevancy table 304 depicts interests A, B, and C because the interest graph engine 204 determined that interests A, B, and C had high enough relevancy ratings to satisfy the predetermined threshold value. In one example, the predetermined threshold value corresponds to the scale used to score the relevancy rating for the interests. Thus, in the example illustrated in FIG. 3, the predetermined threshold value could be 0.009. Therefore, interests A, B, and C are presented in the relevancy table 304 in this example based on a determination that the relevancy values for each of the related interests exceeded the predetermined threshold value (i.e., the relevancy values for interests A, B, and C all exceed a score of 0.009). It is contemplated that other filtering techniques may be equally employed. For example, rather than applying a single threshold to relevancy values as described above, various other factors could be assessed for this purpose. The demographic information as noted above may be used for this purpose. In this case, as a simple illustration, only potential related interests that satisfy certain demographic criteria are considered for presentation, e.g., where the average age associated with the related interest is within a certain range.

Figure 8:
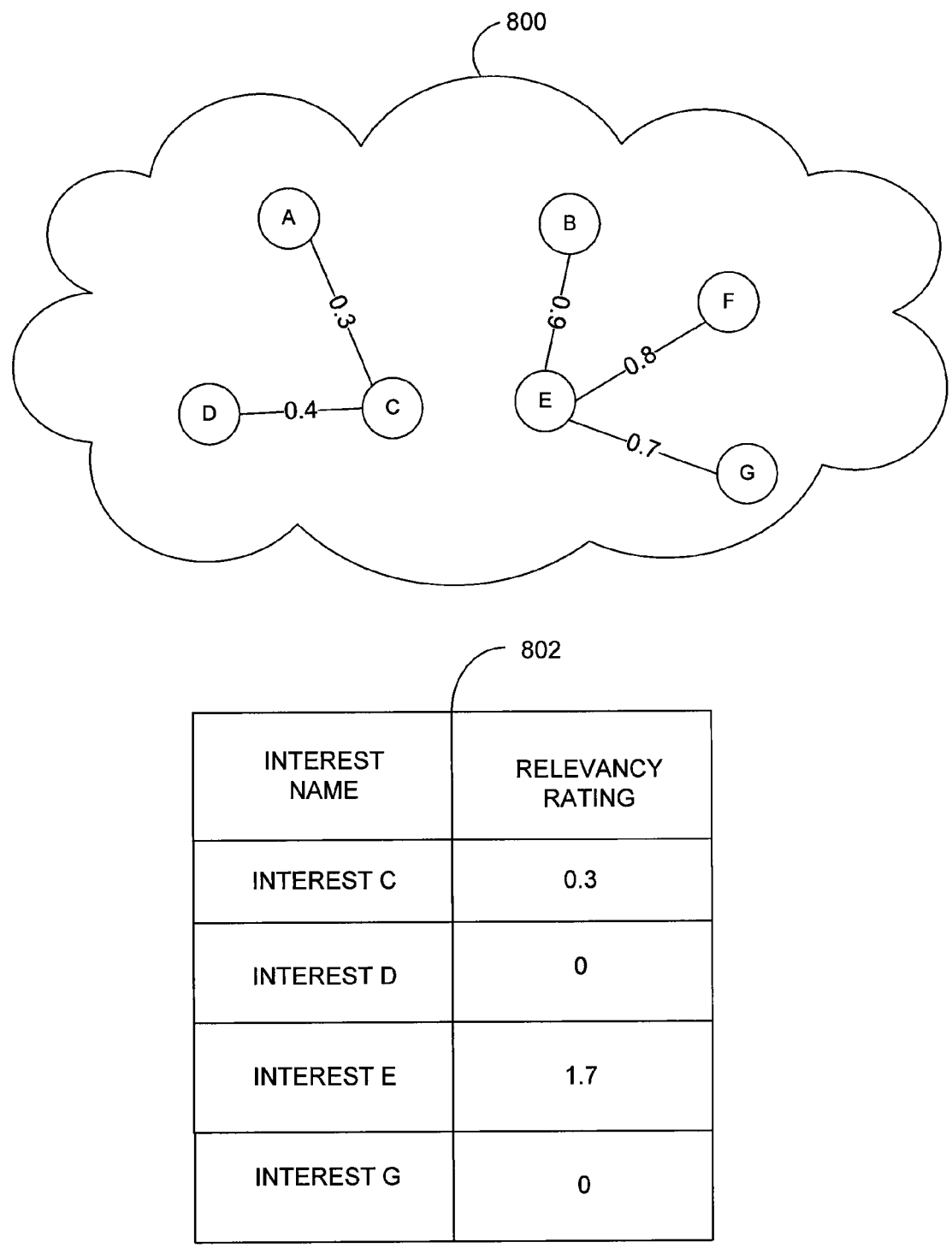
FIG. 8 is a block diagram illustrating another example of an interest graph and a relevancy table derived from the interest graph in accordance with the instant disclosure.

FIG. 8 illustrates an example of how the interest graph engine 204 may identify, via the generated interest graph, at least one interest that is related to, but different from, a new subject's obtained interest(s) to provide at least one related interest. Additionally, FIG. 8 illustrates one way in which relevancy ratings may be calculated for candidate interests. For purposes of FIG. 8, assume that an interest graph 800 has already been generated by, for example, the interest graph engine 204. In this example, the weights listed on the links between the nodes indicate how relevant (i.e., how related) interests are to one another. For example, the weight "0.9" listed on the link between nodes B and E indicates that the interests represented by nodes B and E have a relevancy rating of 0.9. Also for the purposes of FIG. 8, assume that a new subject, John Doe, did not have his interests taken into account when the interest graph 800 was generated. However, assume that the interest graph engine 204 obtained data indicating that John Doe is interested in interests A, B, and F. The relevancy table 802 reflects the probability that John Doe is interested in interests C, D, E, and G based on the knowledge that John Doe is interested in interests A, B, and F. That is, the values illustrated in the "Relevancy Rating" column of the relevancy table 802 reflect the likelihood that John Doe is interested interests C, D, E, and G based on the following calculation.

In order to populate the Relevancy rating column of the relevancy table 802, in one example, the link weights that originate from John Doe's obtained interests (i.e., interests A, B, and F) to potential interests may be summed. For example, because John Doe is interested in interests B and F, we sum the link weights between interests B and E (i.e., 0.9) and between interests F and E (i.e., 0.8) in order to determine that interest E has a relevancy rating of 1.7, which represents the likelihood that John Doe will be interested in interest E. Similarly, the link weight between interest A and interest C is 0.3. Because John Doe did not provide any other obtained interests that were related to interest A, the relevancy rating for interest C is 0.3 (i.e., 0.3+0=0.3).

The scale used in the above example for relevancy ratings and link weights is arbitrary and the instant disclosure recognizes that other suitable scales may be equally employed. In one example, the Probit model is used to predict the likelihood that a user, such as John Doe, will be interested in an interest that differs from their obtained interest. Continuing with the example set forth in FIG. 8, the probability that John Doe is interested in interest C based on his obtained interests may be expressed mathematically as:

$$P(\text{John Doe is Interested in } C) = \Phi(a \times \text{"sum rating of } C\text{"} + b)$$

In the above-equation, "\Phi" is the Gaussian cumulative distribution function with zero (0) mean and unit variance and "sum rating of C" is the relevancy rating listed in the relevancy table 802 (i.e., 0.3). Coefficients "a" and "b" are estimated using, for example, Bayesian estimation or a Maximum Likelihood technique, as those are known in the art. Once coefficient "a" is estimated, a threshold rule may be applied to determine whether the likelihood of John Doe being interested in interest C is high enough to warrant, for example, presentation to John Doe. In one example, interest C will be presented to John Doe as a topic that he is likely to be interested in if the following equation is satisfied, where "T" is the threshold value and may be chosen, for example, such that an error metric is minimized:

$$\text{John Doe is interested in } C \text{ if } \Phi(a \times \text{"sum rating of } C\text{"} + b) > T$$

In some examples, demographic information describing John Doe may also be taken into consideration in determining the likelihood that John Doe is interested in a given topic and weights may be applied to the different demographic data concerning John Doe as desired.

Figure 4:
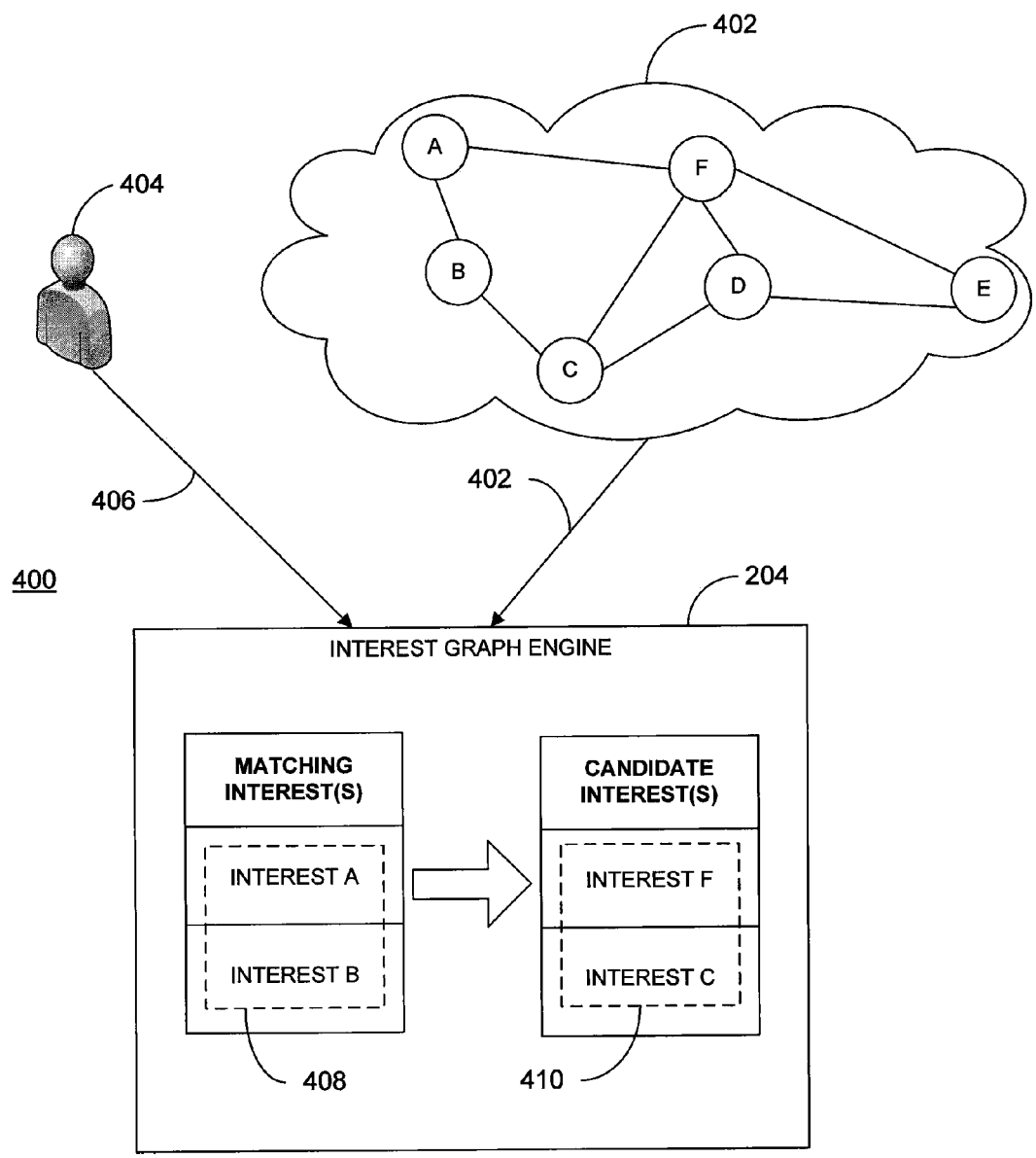
FIG. 4 is a block diagram illustrating one example of a system for using an interest graph in accordance with the present disclosure.

FIG. 4 is a block diagram illustrating one example of a system 400 for using an interest graph 402 in accordance with the teachings of the present disclosure. For the purposes of simplicity, the interest graph 402 shown in FIG. 4 does not depict the dual-links connecting each node, however, it is appreciated that in practice, there could actually be two links between each connected node. Nonetheless, each of the nodes A-F represent one of a plurality of mapped interests (i.e., interests that have already been "mapped" to the interest graph 402). In operation, an interest graph (e.g., interest graph 402) may be used as follows.

The interest graph engine 204 obtains the interest graph 402. In one example, the interest graph 402 is pushed/pulled from a database or computer readable media, however, it is recognized that the interest graph 402 may be obtained in any suitable manner known in the art from any suitable source known in the art (including those sources discussed above with regard to FIG. 2). Similar to the previous discussions on interest graphs, each of the links in the interest graph 402 represent the relatedness of the mapped interests that they are connected to. Continuing, the interest graph engine 204 is also operative to obtain at least one interest 406 from at least one new subject 404 (i.e., a subject's whose interest(s) have not yet been mapped to the interest graph 402 or a previously analyzed subject manifesting a previously unknown interest). The at least one interest 406 represents the at least one new subject's affinity towards at least one topic. Once the one or more interests 406 are obtained from the new subject 404, the interest graph engine is operative to match the obtained interest(s) with at least one of the plurality of mapped interests (e.g., mapped interests A-F). In the example shown in FIG. 4, interests A and B are determined to be matching interests 408. Thus, in this example, the new subject 404 has indicated an interest in topics A and B, which interests were already mapped to the interest graph 402. The interest graph engine 204 may then identify one or more candidate interests 410 for the new subject 404 based on the one or more matching interests 408. The one or more candidate interests 410 represent topics that the new subject 404 is likely to be interested in, based upon the new subject's interest in related topics. Thus, in the example illustrated in FIG. 4, the new subject 404 has indicated an interest in topics A and B. The interest engine 204 matches that data to the interests already mapped in the interest graph 402. Then, the interest graph engine 204 may identify candidate interests 410 based on the matching interests 408. In the illustrated example, candidate interests F and C have been identified because (i) interest F is connected via a link to matching interest A (indicating relatedness) and (ii) interest C is connected via a link to matching interest B (again, indicating relatedness). In this manner, system 400 may be used to predict interests for new subjects based upon a small amount of interest data obtained from the new subject.

In practice, this type of information may be used, for example, to develop targeted/customized advertisements for consumers by leveraging known interest information. For example, following the identification of candidate interest(s) 410, in one example, the interest graph engine 204 may present information related to the candidate interest(s) to the new subject 404. As used herein, "information related to the candidate interest(s)" may include the candidate interest(s) themselves, or tangentially related information. For example, if "Apple® brand" was identified as being a candidate interest 410 of the new subject 404, in one embodiment the phase "Apple brand" or the like could be presented to the new subject 404. However, consistent with the teachings of the present disclosure, a video advertisement for the Apple iPod® could also be suitably presented. Of course, the particular medium in which the information related to the candidate interest(s) is presented is not critical to the instant disclosure. For example, rather than presenting a video commercial, an audio commercial or a print advertisement could be presented.

Furthermore, in one example, presenting information related to the candidate interest(s) 410 may include generating, by the interest graph engine 204, display data representative of the information related to the candidate interest(s) to provide a visual representation of the information related to the candidate interest(s). In addition, and similar to the discussion on using predetermined threshold information provided above, in one example, presenting information related to the candidate interest(s) may include selecting which candidate interest(s) 410 to present information related to for, based on predetermined threshold information.

Figure 5:
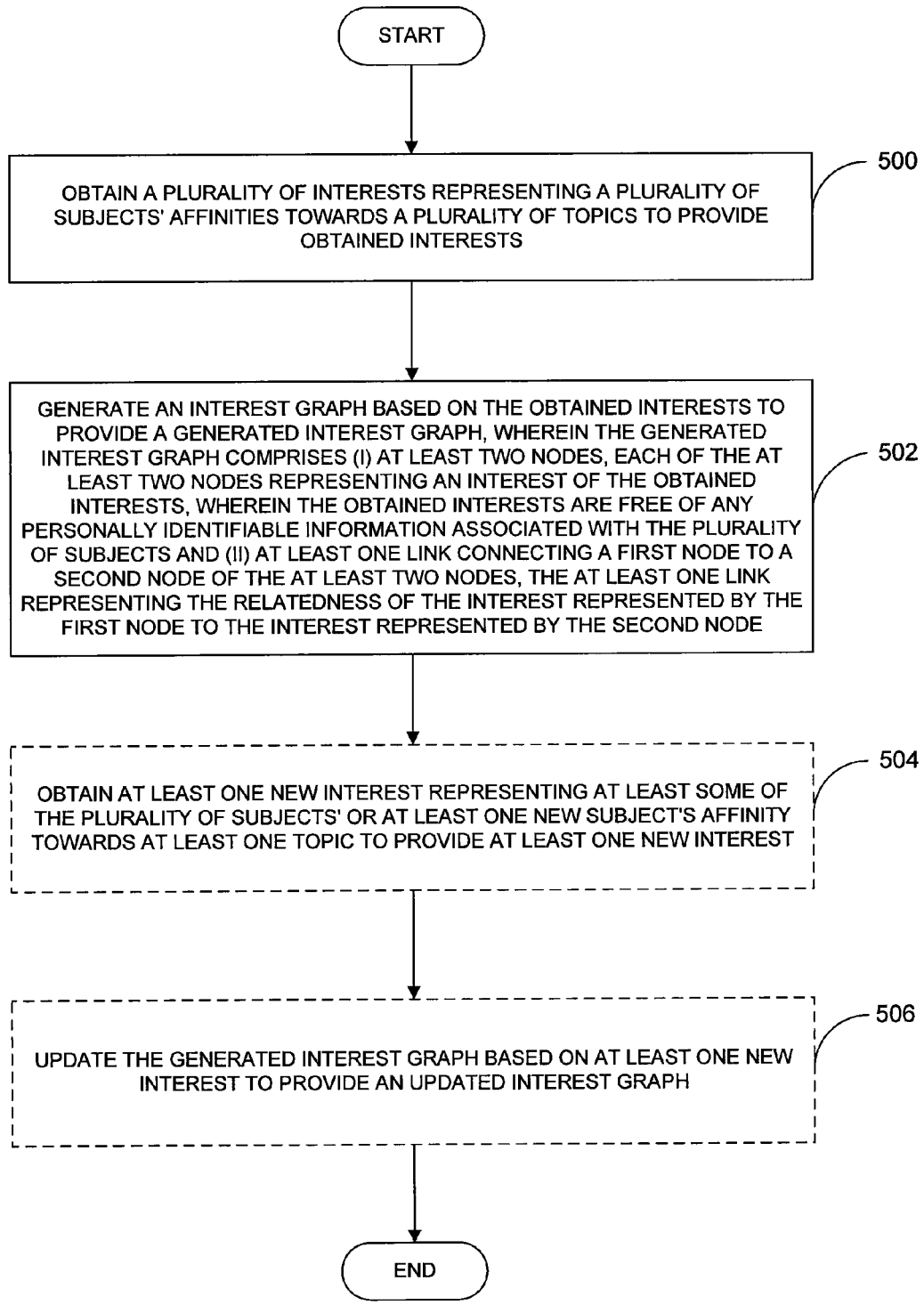
FIG. 5 is a flowchart generally depicting one example of a method for generating and updating an interest graph in accordance with the instant disclosure.

Referring now to FIG. 5, a flowchart illustrating a method for generating an interest graph in accordance with the instant disclosure is provided. While the system 200 is one form for implementing the processing described herein (including that illustrated in FIG. 5), those having ordinary skill in the art will appreciate that other, functionally equivalent techniques may be employed. Furthermore, as known in the art, some or all of the functionalities implemented via executable instructions may also be implemented using firmware and/or hardware devices such as application specific integrated circuits (ASICs), programmable logic arrays, state machines, etc. Once again, those of ordinary skill in the art will appreciate the wide number of variations that may be used is this manner.

Beginning at block 500, a plurality of interests representing a plurality of subjects' affinities towards a plurality of topics are obtained to provide obtained interests. At block 502, an interest graph is generated based on the obtained interests to provide a generated interest graph. The generated interest graph includes at least two nodes, each of the at least two nodes representing an interest of the obtained interests. The obtained interests are free of any personally identifiable information associated with the plurality of subjects. The generated interest graph also includes at least one link connecting a first node to a second node of the at least two nodes, the at least one link representing the relatedness of the interest represented by the first node to the interest represented by the second node. At optional block 504, at least one new interest representing at least some of the plurality of subjects' or at least one new subject's affinity towards at least one topic is obtained to provide at least one new interest. Finally, at optional block 506, the generated interest graph is updated based on the at least one new interest to provide an updated interest graph.

Figure 6:
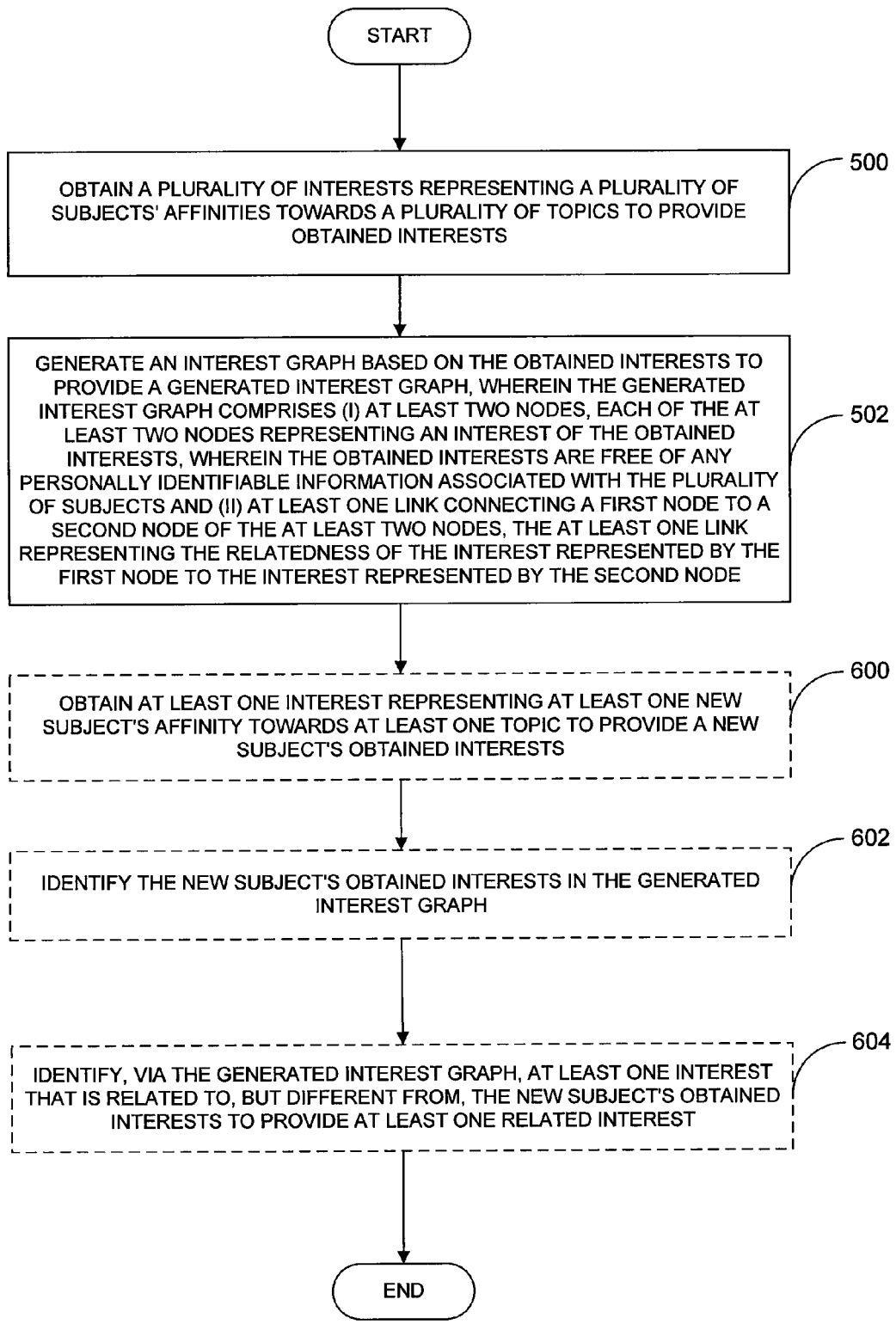
FIG. 6 is a flowchart generally depicting another example of a method for generating an interest graph in accordance with the instant disclosure.

FIG. 6 is a flowchart generally depicting another example of a method for generating an interest graph in accordance with the instant disclosure. Processing at blocks 500-502 is carried out in accordance with the discussion provided above with regard to FIG. 5. At optional block 600, at least one interest representing at least one new subject's affinity towards at least one topic is obtained to provide a new subject's obtained interests. At optional block 602, the new subject's obtained interests are identified in the generated interest graph. Finally, at optional block 604, at least one interest that is related to, but different from, the new subject's obtained interest is identified via the generated interest graph to provide at least one related interest.

Figure 7:
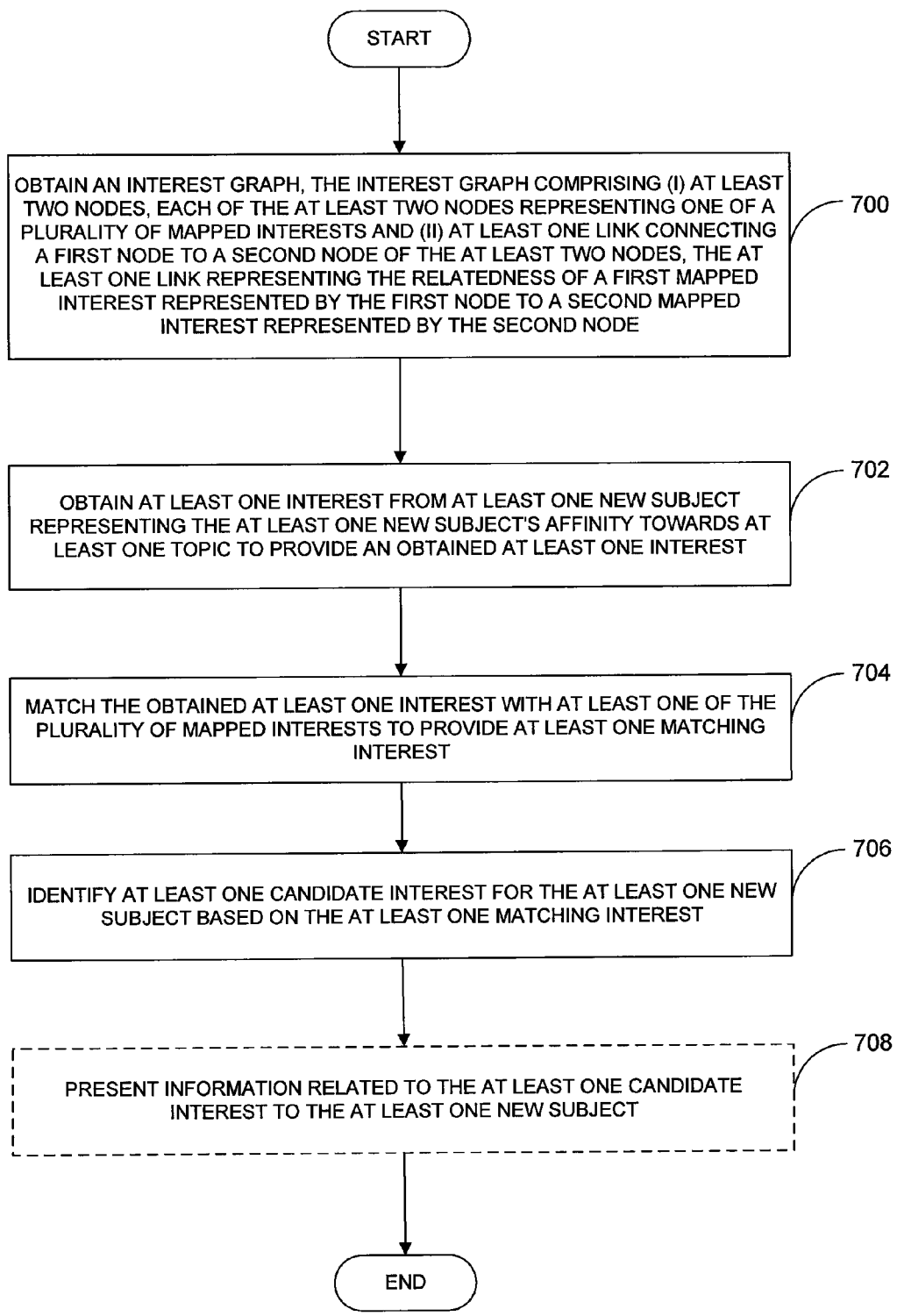
FIG. 7 is a flowchart generally depicting one example of a method for using an interest graph in accordance with the instant disclosure.

FIG. 7 is a flowchart generally depicting one example of a method for using an interest graph representing the relatedness of a plurality of subjects' affinities towards a plurality of topics. At block 700, an interest graph is obtained. The obtained interest graph includes (i) at least two nodes, each of the at least two nodes representing one of a plurality of mapped interests and (ii) at least one link connecting a first node to a second node of the at least two nodes, the at least one link representing the relatedness of a first mapped interest represented by the first node to a second mapped interest represented by the second node. At block 702, at least one interest is obtained from at least one new subject. The at least one interest represents the at least one new subject's affinity towards at least one topic to provide an obtained at least one interest. At block 704, the obtained at least one interest is matched with at least one of the plurality of mapped interests to provide at least one matching interest. At block 706, at least one candidate interest is identified for the at least one new subject based on the at least one matching interest. Finally, at optional block 708, information related to the at least one candidate interest is presented to the at least one new subject.

While particular embodiments have been shown and described, those skilled in the art will appreciate that changes and modifications may be made without departing from the instant teachings. It is therefore contemplated that any and all modifications, variations or equivalents of the above-described teachings fall within the scope of the basic underlying principles disclosed above and claimed herein.

What is claimed is:

1. A method for using an interest graph, the method comprising:
obtaining, by a processing device, a plurality of interests,
the plurality of interests being associated with a plurality of users, and
the plurality of interests being associated with a plurality of topics;
generating, by the processing device and based on the obtained plurality of interests, the interest graph,
the interest graph including:
a plurality of nodes,
each of the plurality of nodes representing a respective interest of the obtained plurality of interests; and
at least one link,
the at least one link linking a first node, of the plurality of nodes, to a second node, of the plurality of nodes, and
the at least one link representing a measure of relatedness of the respective interest represented by the first node to the respective interest represented by the second node;
receiving, by the processing device, one or more user interests associated with a particular user;
determining, by the processing device and using the interest graph, that the one or more received user interests do not match any of the obtained plurality of interests;
determining, by the processing device and based on determining that the one or more received user interests do not match any of the obtained plurality of interests, a measure of similarity between the one or more received user interests and at least one of the obtained plurality of interests;
associating, by the processing device and when the measure of similarity between the one or more received user interests and the at least one of the obtained plurality of interests satisfies a threshold value, at least one of the one or more received user interests with the at least one of the obtained plurality of interests; and
providing, by the processing device and based on associating the at least one of the one or more received user interests with the at least one of the obtained plurality of interests, information associated with the at least one of the obtained plurality of interests to the particular user.

2. The method of claim 1, where, when obtaining the plurality of interests, the method includes:
obtaining self-stated interests,
the self-stated interests including categorical indications of the obtained plurality of interests.

3. The method of claim 2, where, when obtaining the self-stated interests, the method includes:
analyzing a website for information associated with at least one of the obtained plurality of interests.

4. The method of claim 3, where, when analyzing the website, the method includes:
analyzing at least one of:
information associated with liking a particular topic;
information associated with posting a message on the website indicating an interest in the particular topic;
information associated with posting a rating on the website indicating an interest in the particular topic; or
information associated with posting a review on the website indicating an interest in the particular topic.

5. The method of claim 1, where, when obtaining the plurality of interests, the method includes:
obtaining self-revealing interests,
the self-revealing interests including permission-based indications of the obtained plurality of interests.

6. The method of claim 5, where, when obtaining the self-revealing interests, the method includes:
analyzing a website for information associated with at least one of the obtained plurality of interests.

7. The method of claim 6, where, when analyzing the website, the method includes:
analyzing at least one of:
information associated with a purchase history via the website;
information associated with a web-browsing behavior on the website; or
information associated with one or more messages posted on the website.

8. The method of claim 1, where each of the at least one link is associated with a weight indicating a measure of relatedness of the respective interest to another respective interest.

9. The method of claim 1, further comprising:
obtaining demographic information associated with at least one of the plurality of users,
where, when generating the interest graph, the method includes:
generating the interest graph further based on the obtained demographic information.

10. The method of claim 9, where the at least one link comprises at least a portion of the demographic data.

11. The method of claim 1, further comprising:
providing, for presentation, information associated with at least a portion of the generated interest graph.

12. The method of claim 1, further comprising:
obtaining at least one new interest associated with at least one of the plurality of users; and
updating the generated interest graph based on at least one new interest.

13. The method of claim 12, further comprising:
providing, for presentation, information associated with at least a portion of the updated interest graph.

14. A method for using an interest graph, the method comprising:
obtaining, by a processing device, demographic information associated with a particular user;
obtaining, by the processing device, the interest graph,
the interest graph being based on the obtained demographic information, and
the interest graph including:
a plurality of nodes,
each of the plurality of nodes representing a respective interest of a plurality of obtained interests; and
at least one link,
the at least one link linking a first node, of the plurality of nodes, to a second node, of the plurality of nodes, and
the at least one link representing a measure of relatedness of the respective interest represented by the first node to the respective interest represented by the second node;
receiving, by the processing device, one or more user interests associated with the particular user,
the one or more user interests being associated with at least one of self-stated interests or self-revealing interests,
the self-stated interests including categorical indications of the one or more user interests,
the self-revealing interests including permission-based indications of the one or more user interests, and
the at least one of self-stated interests or self-revealing interests being received based on an analysis of a website for information associated with at least one of the one or more user interests;
determining, by the processing device and using the interest graph, that the one or more received user interests do not match any of the obtained plurality of interests;
determining, by the processing device and based on determining that the one or more received user interests do not match any of the obtained plurality of interests, a measure of similarity between the one or more received user interests and at least one of the obtained plurality of interests;
associating, by the processing device and when the measure of similarity between the one or more received user interests and the at least one of the obtained plurality of interests satisfies a threshold value, at least one of the one or more received user interests with the at least one of the obtained plurality of interests; and
providing, by the processing device and based on associating the at least one of the one or more received user interests with the at least one of the obtained plurality of interests, information associated with the at least one of the obtained plurality of interests to the particular user.

15. The method of claim 14, where each of the at least one link is associated with a weight indicating a measure of relatedness of the respective interest to another respective interest.

16. The method of claim 14, further comprising:
providing, by the processing device and for presentation, information associated with at least a portion of the generated interest graph;
obtaining, by the processing device, at least one new interest associated with at least one of the plurality of users;
updating, by the processing device, the generated interest graph based on at least one new interest; and
providing, by the processing device and for presentation, information associated with at least a portion of the updated interest graph.

17. An apparatus for using an interest graph, the apparatus comprising:
a memory to store instructions; and
a processor to execute the instructions to:
obtain a plurality of interests,
the plurality of interests being associated with a plurality of users, and
the plurality of interests being associated with a plurality of topics;
generate, based on the obtained plurality of interests, the interest graph,
the interest graph including:
a plurality of nodes,
each of the plurality of nodes representing a respective interest of the obtained plurality of interests; and
at least one link,
the at least one link linking a first node, of the plurality of nodes, to a second node, of the plurality of nodes, and
the at least one link representing a relatedness of the respective interest represented by the first node to the respective interest represented by the second node;
receive one or more user interests associated with a particular user;
determine, using the interest graph, that the one or more received user interests do not match any of the obtained plurality of interests;
determine, based on determining that the one or more received user interests do not match any of the obtained plurality of interests, a measure of similarity between the one or more received user interests and at least one of the obtained plurality of interests;
associate, when the measure of similarity between the one or more received user interests and the at least one of the obtained plurality of interests satisfies a threshold value, at least one of the one or more received user interests with the at least one of the obtained plurality of interests; and
provide, based on associating the at least one of the one or more received user interests with the at least one of the obtained plurality of interests, information associated with the at least one of the obtained plurality of interests to the particular user.

18. The apparatus of claim 17, where the processor, when obtaining the plurality of interests, is further to:
obtain self-stated interests,
the self-stated interests including categorical indications of the plurality of interests.

19. The apparatus of claim 18, where the processor, when obtaining the self-stated interests, is further to:
analyze a website for information associated with at least one of the obtained plurality of interests.

20. The apparatus of claim 19, where the processor, when analyzing the website, is further to:
analyze at least one of:
information associated with liking a particular topic;
information associated with posting a message on the website indicating an interest in the particular topic;
information associated with posting a rating on the website indicating an interest in the particular topic; or
information associated with posting a review on the website indicating an interest in the particular topic.

21. The apparatus of claim 17, where the processor, when obtaining the plurality of interests, is further to:
obtain self-revealing interests,
the self-revealing interests including permission-based indications of the obtained plurality of interests.

22. The apparatus of claim 21, where the processor, when obtaining the self-revealing interests, is further to:
analyze a website for information associated with at least one of the obtained plurality of interests.

23. The apparatus of claim 22, where the processor, when analyzing the website, is further to:
analyze at least one of:
information associated with a purchase history via the website;
information associated with a web-browsing behavior on the website; or
information associated with one or more messages posted on the website.

24. The apparatus of claim 17, where each of the at least one link is associated with a weight indicating a measure of relatedness of the respective interest to another respective interest.

25. The apparatus of claim 17, where the processor is further to:
obtain demographic information associated with at least one of the plurality of users,
where the processor, when generating the interest graph, is further to:
generate the interest graph further based on the obtained demographic information.

26. The apparatus of claim 25, where the at least one link comprises at least a portion of the demographic data.

27. The apparatus of claim 17, where the processor is further to:
provide, for presentation, information associated with at least a portion of the generated interest graph.

28. The apparatus of claim 17, where the processor is further to:
obtain at least one new interest associated with at least one of the plurality of users; and
update the generated interest graph based on at least one new interest.

29. The apparatus of claim 28, where the processor is further to:
provide, for presentation, information associated with at least a portion of the updated interest graph.

30. An apparatus for using an interest graph, the apparatus comprising:
a memory to store instructions; and
a processor to execute the instructions to:
obtain demographic information associated with a particular user;
obtain the interest graph,
the interest graph being based on the obtained demographic information, and
the interest graph including:
a plurality of nodes,
each of the plurality of nodes representing a respective interest of a plurality of interests; and
at least one link,
the at least one link linking a first node, of the plurality of nodes, to a second node, of the plurality of nodes, and
the at least one link representing a measure of relatedness of the respective interest represented by the first node to the respective interest represented by the second node;
receive one or more user interests associated with the particular user,
the one or more user interests being associated with at least one of self-stated interests or self-revealing interests,
the self-stated interests including categorical indications of the one or more user interests,
the self-revealing interests including permission-based indications of the one or more user interests, and
the at least one of self-stated interests or self-revealing interests being received based on an analysis of a website for information associated with at least one of the one or more user interests;
determine, using the interest graph, that the one or more received user interests do not match any of the plurality of interests;
determine, based on determining that the one or more received user interests do not match any of the plurality of interests, a measure of similarity between the one or more received user interests and at least one of the plurality of interests;
associate, when the measure of similarity between the one or more received user interests and the at least one of the plurality of interests satisfies a threshold value, at least one of the one or more received user interests with the at least one of the plurality of interests; and
provide, based on associating the at least one of the one or more received user interests with the at least one of the plurality of interests, information associated with the at least one of the plurality of interests to the particular user.

31. The apparatus of claim 30, where each of the at least one link is associated with a weight indicating a measure of relatedness of the respective interest to another respective interest.

32. The apparatus of claim 30, where the processor is further to:
provide, for presentation, information associated with at least a portion of the generated interest graph;
obtain at least one new interest associated with at least one of the plurality of users;

update the generated interest graph based on at least one new interest; and provide, for presentation, information associated with at least a portion of the updated interest graph.

33. A non-transitory computer-readable medium storing instructions, the instructions comprising:
one or more instructions which, when executed by a processor, cause the processor to:
obtain a plurality of interests,
the plurality of interests being associated with a plurality of users, and
the plurality of interests being associated with a plurality of topics;
generate, based on the obtained plurality of interests, an interest graph,
the interest graph including:
a plurality of nodes,
each of the plurality of nodes representing a respective interest of the obtained plurality of interests; and
at least one link,
the at least one link linking a first node, of the plurality of nodes, to a second node, of the plurality of nodes, and
the at least one link representing a relatedness of the respective interest represented by the first node to the respective interest represented by the second node;
receive one or more user interests associated with a particular user;
determine, using the interest graph, that the one or more received user interests do not match any of the obtained plurality of interests;
determine, based on determining that the one or more received user interests do not match any of the obtained plurality of interests, a measure of similarity between the one or more received user interests and at least one of the obtained plurality of interests;
associate, when the measure of similarity between the one or more received user interests and the at least one of the obtained plurality of interests satisfies a threshold value, at least one of the one or more received user interests with the at least one of the obtained plurality of interests; and
provide, based on associating the at least one of the one or more received user interests with the at least one of the obtained plurality of interests, information associated with the at least one of the obtained plurality of interests to the particular user.

34. The medium of claim 33, where the instructions further include:
one or more instructions executable by the processor to obtain self-stated interests and self-revealing interests,
the self-stated interests including categorical indications of the plurality of interests,
the self-revealing interests including permission-based indications of the plurality of interests, and
the one or more instructions executable by the processor to obtain the self-stated interests and the self-revealing interests including:
one or more instructions executable by the processor to analyze a website for information associated with at least one of the obtained plurality of interests.

35. The medium of claim 33, where the instructions further include:
one or more instructions executable by the processor to obtain demographic information associated with at least one of the plurality of users,
the one or more instructions executable by the processor to generate the interest graph including:
the one or more instructions executable by the processor to generate the interest graph further based on the obtained demographic information.

36. The medium of claim 33, where the instructions further include:
one or more instructions executable by the processor to provide, for presentation, information associated with at least a portion of the generated interest graph;
one or more instructions executable by the processor to obtain at least one new interest associated with at least one of the plurality of users;
one or more instructions executable by the processor to update the generated interest graph based on at least one new interest; and
one or more instructions executable by the processor to provide, for presentation, information associated with at least a portion of the updated interest graph.

37. A non-transitory computer-readable medium storing instructions, the instructions comprising:
one or more instructions which, when executed by a processor, cause the processor to:
obtain demographic information associated with a particular user;
obtain an interest graph,
the interest graph being based on the obtained demographic information, and
the interest graph including:
a plurality of nodes,
each of the plurality of nodes representing a respective interest of a plurality of interests; and
at least one link,
the at least one link linking a first node, of the plurality of nodes, to a second node, of the plurality of nodes, and
the at least one link representing a measure of relatedness of the respective interest represented by the first node to the respective interest represented by the second node;
receive one or more user interests associated with the particular user,
the one or more user interests being associated with at least one of self-stated interests or self-revealing interests,
the self-stated interests including categorical indications of the one or more user interests,
the self-revealing interests including permission-based indications of the one or more user interests, and
the at least one of self-stated interests or self-revealing interests being received based on an analysis of a website for information associated with at least one of the one or more user interests;
determine, using the interest graph, that the one or more received user interests do not match any of the plurality of interests;
determine, based on determining that the one or more received user interests do not match any of the plurality of interests, a measure of similarity between the one or more received user interests and at least one of the plurality of interests;

associate, when the measure of similarity between the one or more received user interests and the at least one of the plurality of interests satisfies a threshold value, at least one of the one or more received user interests with the at least one of the plurality of interests; and provide, based on associating the at least one of the one or more received user interests with the at least one of the plurality of interests, information associated with the at least one of the plurality of interests to the particular user.

38. The medium of claim 37, where the instructions further include:
one or more instructions executable by the processor to provide, for presentation, information associated with at least a portion of the generated interest graph;
one or more instructions executable by the processor to obtain at least one new interest associated with at least one of the plurality of users;
one or more instructions executable by the processor to update the generated interest graph based on at least one new interest; and
one or more instructions executable by the processor to provide, for presentation, information associated with at least a portion of the updated interest graph.

* * * * *